(No Model.)
H. C. CHAPLIN.
Dumping Wagon.
No. 230,527.  Patented July 27, 1880.
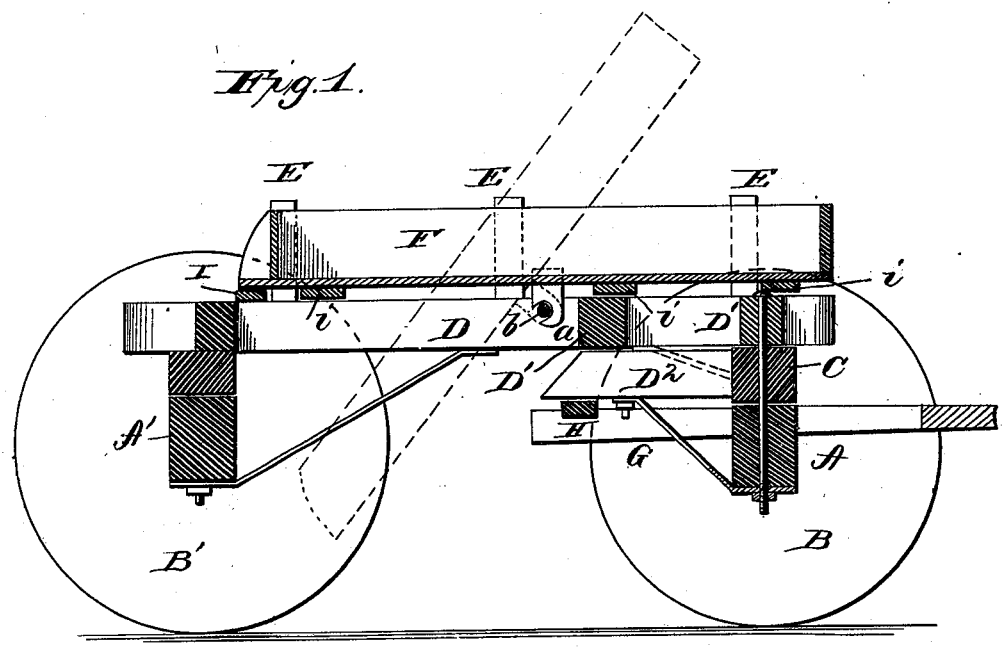
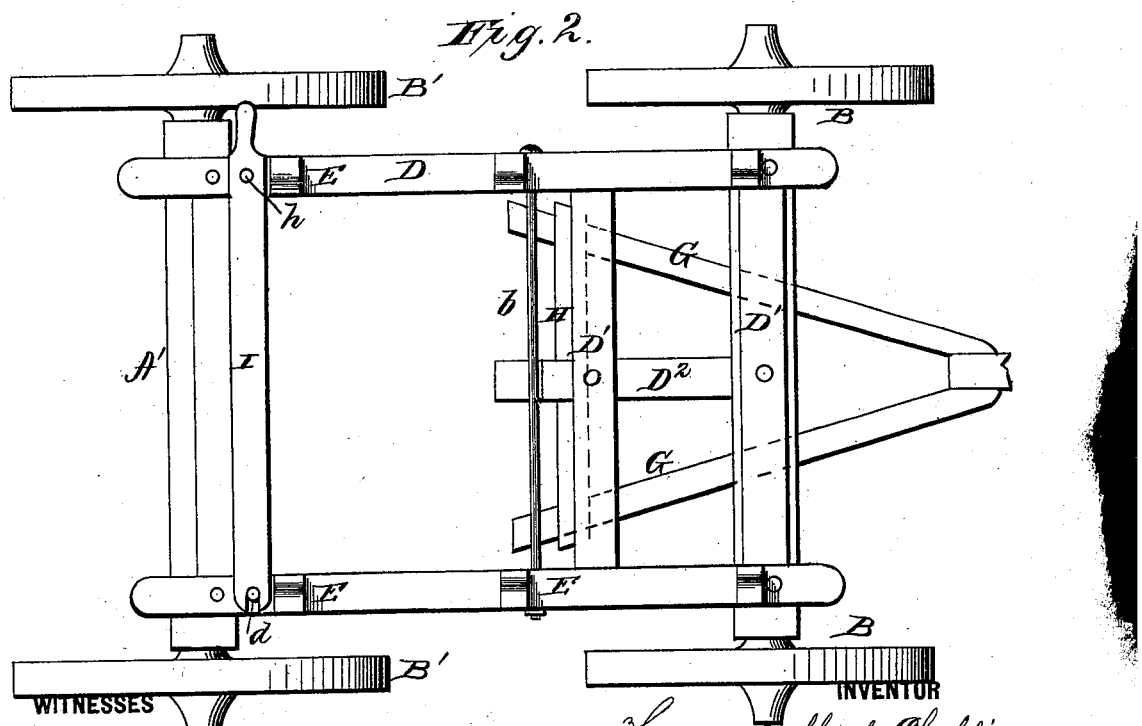
WITNESSES
Franck L. Ouraud
H. Aubrey Toulmin
INVENTOR
Henry Clifford Chaplin
By Alexander Mason
ATTORNEY

UNITED STATES PATENT OFFICE.

HENRY C. CHAPLIN, OF CHARLOTTESVILLE, VIRGINIA.

DUMPING-WAGON.

SPECIFICATION forming part of Letters Patent No. 230,527, dated July 27, 1880.

Application filed April 5, 1880. (No model.)

*To all whom it may concern:*

Be it known that I, HENRY C. CHAPLIN, of Charlottesville, in the State of Virginia, have invented certain new and useful Improvements in Dumping-Wagons; and I do hereby declare that the following is a full, clear, and exact description thereof, reference being had to the accompanying drawings, and to letters of reference marked thereon, making a part of this specification.

The nature of my invention consists in the construction and arrangement of a dumping-wagon in which the body dumps in front of the rear axle, as will be hereinafter more fully set forth.

In order to enable others skilled in the art to which my invention appertains to make and use the same, I will now proceed to describe its construction and operation, referring to the annexed drawings, in which—

Figure 1 is a longitudinal vertical section of my dumping-wagon. Fig. 2 is a plan view of the same with the body removed.

A represents the front axle, with wheels B and bolster C. A' is the rear axle, with wheels B'. These axles may be straight or arched, as desired.

On the bolster C and rear axle, A', is secured a frame, D, having suitable side standards, E, between which the body F is placed, said body resting in front of its center upon two cross-bars, D', in the frame D.

At or near the center on each side of the body F is a downwardly-projecting hook, $a$, which hooks pass over a rod, $b$, in the frame D. The rear end of the body F is supported upon a bar, I, one end of which is notched and fits on a pin, $d$, on the frame, while the other end forms a handle, and is fastened by a pin, $h$, to the other side of the frame. By removing this pin $h$ the bar I can be turned outward and pulled out altogether, when the body will dump backward within the frame in front of the rear axle. After being dumped the body is thrown up again, the notched end of the bar I fitted over the pin $d$, and then turned inward under the rear end of the body until the pin $h$ can be inserted for fastening the bar.

The inner edge of the bar I is beveled, so that it will easily slip in under the body.

In the center to the under side of the cross-bars D' is attached a bar, $D^2$, which acts instead of the coupling-pole for the slide H, connecting the rear ends of the hounds G G, to work up against, which helps to keep the tongue or pole from sagging.

When the wagon is not to be used as a dumping-wagon the bar I is dispensed with and the body can be set back so as to rest on the frame in the same manner as ordinary wagons, there being cleats $i$ attached to the under side of the body to form stops against the end pieces of the frame for that purpose.

The rear axle may be bent rearward, so as to keep the front and hind wheels comparatively close together, while the body can be very long and yet dump in front of the rear axle.

When wood, rails, or anything of that kind is to be hauled the body can be removed and the frame used as in ordinary wagons.

Having thus fully described my invention, what I claim as new, and desire to secure by Letters Patent, is—

The combination of the frame D, having the rod $b$ passing through it, the body F, with hooks $a$ $a$, the notched bar I, and pins $d$ $h$, substantially as and for the purposes herein set forth.

In testimony that I claim the foregoing I have hereunto set my hand this 1st day of April, 1880.

HENRY CLIFFORD CHAPLIN.

Witnesses:
L. R. SNEAD,
J. J. MCCARTHY.